United States Patent [19]

Rasmussen

[11] Patent Number: 4,606,671
[45] Date of Patent: Aug. 19, 1986

[54] COUPLING FOR CONNECTING A HUB AND SHAFT

[75] Inventor: Ivar Rasmussen, Sønderborg, Denmark

[73] Assignee: Danfoss A/S, Nordborg, Denmark

[21] Appl. No.: 610,863

[22] Filed: May 16, 1984

[30] Foreign Application Priority Data

Jun. 6, 1983 [DE] Fed. Rep. of Germany ....... 3320444

[51] Int. Cl.[4] .............................................. F16B 7/02
[52] U.S. Cl. ................................... 403/359; 403/316; 403/357; 403/14
[58] Field of Search ............... 403/359, 316, 315, 355, 403/356, 357, 13, 14; 411/140; 91/467

[56] References Cited

U.S. PATENT DOCUMENTS

| | | | |
|---|---|---|---|
| 2,650,484 | 9/1953 | Bujak | 403/359 X |
| 2,984,215 | 5/1961 | Charlson | 91/467 |
| 3,061,341 | 10/1962 | Grzych et al. | 416/134 |
| 3,140,630 | 7/1964 | Wolf | 411/140 X |
| 3,167,338 | 1/1965 | Troike | 403/359 |
| 3,421,783 | 1/1969 | Sakai | 403/357 |
| 3,517,953 | 6/1970 | Wright et al. | 403/316 |
| 3,608,936 | 9/1971 | Karden | 403/327 |
| 3,865,500 | 2/1975 | Newell | 403/359 |
| 4,500,226 | 2/1985 | Monnier et al. | 403/359 X |

*Primary Examiner*—Cornelius J. Husar
*Assistant Examiner*—Joseph A. Fischetti
*Attorney, Agent, or Firm*—Wayne B. Easton

[57] ABSTRACT

The invention relates to a coupling for making a connection secured against relative rotational and axial displacement between a hub member and a shaft member. The shaft and hub members have engaging keys and grooves at the internal and external circumferences thereof. The hub member has a circumferential groove undercutting the keys thereof and an insert member having the same key and groove configuration as the shaft member is disposed therein. The insert member is circumferentially offset relative to the hub member so that the respective keys and grooves thereof are out of alignment. The keys of the insert and hub members are then in axially abutting engagement with the insert member serving as an anchor so that a screw connection between the shaft and the insert members allows the shaft and hub members to be drawn towards each other to form a firm and secure connection.

8 Claims, 6 Drawing Figures

4,606,671

COUPLING FOR CONNECTING A HUB AND SHAFT

BACKGROUND OF THE INVENTION (1) Field of the Invention

The invention relates to a coupling for making a connection secured against rotation and axial displacement between a hub having keys and grooves at the internal circumference and a shaft with keys and grooves at the external circumference, wherein the keys of one part engage in the grooves of the other part and radial projections connected to the shaft engage in a circumferential groove undercutting the keys of the hub.

(2) Description of Related Art

In a known coupling of this kind (U.S. Pat. No. 3,061,341), the circumferential groove is substantially mid-length of the hub cavity. Two balls serving as radial projections are mounted in the shaft and pressed radially outwardly by elastic bodies. The parts of this coupling are easy to assemble and dismantle. There is also a connection secured against rotation and axial displacement. However, on the occurrence of larger axial forces or radial forces, play between the hub and shaft is not avoidable within the scope of manufacturing tolerances.

SUMMARY OF THE INVENTION

The invention is based on the problem of providing a coupling of the aforementioned kind which, despite easy releasability, permits a rigid connection between the hub and shaft.

This problem is solved according to the invention in that the radial projections are formed fixed to an insert which is fixed to rotate with the hub and a screw which passes through the shaft and engages in a tapped hole of the insert, presses the shaft with an external shoulder against a backing face of the hub.

By using the insert, an axial counterbearing is obtained. The shaft can therefore be axially clamped to the hub. In the clamped condition, play is no longer possible even on the occurrence of larger axial and radial forces.

In particular, the external shoulder should be provided with a conical oblique face. Upon axial clamping, this automatically leads to centreing of the shaft in the hub so that both parts are sure to be axially aligned with respect to each other.

It is particularly favourable if the insert can be introduced only from the shaft inserting side and the radial projections have such a cross-section that they can be pushed through the grooves of the hub. This increases the number of possible uses because the hub can be shaped as desired not only at its circumference but also at the side opposite to the shaft inserting side. The insert is then introduced from the side at which the shaft is inserted and is brought to the locked position by turning it through an angle.

In particular, the radial projections can in this case be shaped and arranged to conform to the parts of the shaft. The larger number of radial projections gives a correspondingly large supporting face at the keys of the hub.

Advantageously, the circumferential groove is disposed at the end of the hub opposite to the shaft inserting side. The larger the axial spacing between the insert and backing face, the less is there a danger of incorrect axial alignment.

To hold the insert against rotation at the hub, a pin may be arranged between two radial projections and engage in a groove of the hub.

Another possibility is for a pin to engage in eccentric bores of the insert and shaft.

Particular advantages are obtained if this pin is longer than the hub cavity. The pin already introduced into the insert will then project from the hub so that it can be conveniently introduced in the eccentric bore of the shaft.

Further, the pin should be a resilient clamping pin. During assembly, such a pin is securely held in the associated bore.

In the simplest case, the backing face of the hub is formed by its end face.

The coupling here described can even be used if the hub cavity is closed at one side.

In particular, the hub may be part of a rotary valve of a hydraulic steering device, the shaft carrying the steering wheel and being mounted exclusively by the hub. This is in contrast with previous constructions in which the steering wheel shaft is mounted in the housing and connected to the rotary valve by way of a coupling permitting a certain amount of play.

Two examples of the invention will now be described in more detail with reference to the drawing, wherein:

DESCRIPTION OF THE PREFERRED EMBODIMENTS

Figure 1:
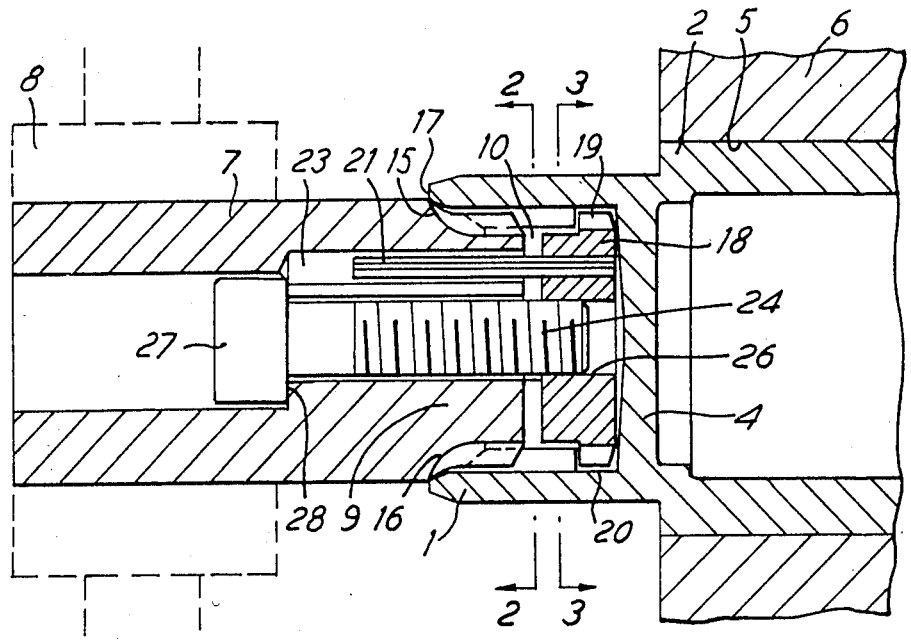
FIG. 1 is a section through a first embodiment of the coupling according to the invention.
Figure 2:
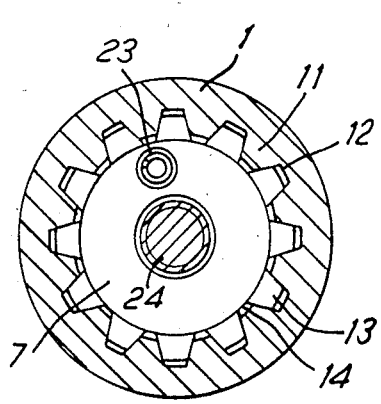
FIG. 2 is a section on the line A—A in FIG. 1.
Figure 3:
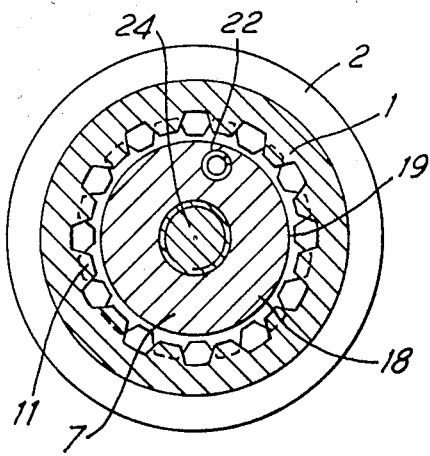
FIG. 3 is a section on the line B—B in FIG. 1.
Figure 4:
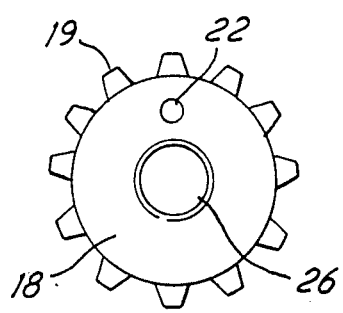
FIG. 4 is an end elevation of the insert.
Figure 5:
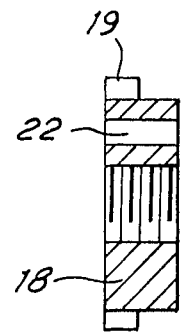
FIG. 5 is a section through the insert.

The construction illustrated in FIGS. 1 to 5 comprises a hub 1 made in one piece with a rotary valve sleeve 2 and closed against the interior 3 of the rotary valve sleeve 2 by an end wall 4. The rotary valve sleeve 2 is rotatably mounted in the bore 5 of a housing 6 or can be mounted in known manner (see U.S. Pat. No. 2,984,215) in an external rotary valve sleeve. The control orifices in the sleeve and bore are not illustrated. A shaft 7 is coupled to the hub 1. As is indicated in broken lines, a manual steering wheel 8 may be secured on this shaft. The shaft 7 has its front end 9 inserted in a hub cavity 10. In this region, the hub has at the internal circumference keys 11 with interposed grooves 12 whilst the shaft 7 exhibits keys 13 and grooves 14 therebetween. The shaft has an external shoulder 15 with a preceding conical oblique surface 16. By means of this external shoulder, it lies against a backing face 17 formed by the end of the hub 1.

At the circumference, an insert 18 carries radial projections 19 corresponding in arrangement and shape with the keys 13 of shaft 7. This insert 18 is introduced in the hub cavity 10 from the shaft inserting side and then turned through such an angle that the radial projections 19 of the insert 18 lie behind the keys 11 of hub 1. This is possible because there is a circumferential groove 20 at the end of the hub cavity 10 opposite to the shaft inserting side. In this rotary position, the insert 18 is locked insofar that a clamping pin 21 which is formed by a resilient hollow cylinder is introduced on the one hand in an eccentric bore 22 of the insert 18 and on the other hand in an eccentric bore 23 of the shaft 7. The clamping pin 21 is so long that it projects from the hub cavity 10 so that it can be conveniently introduced in the bore 23.

A screw 24 is arranged in a bore 25 of the shaft and engages in a tapped hole 26 of insert 18. The head 27 of the screw is supported against a step 28 of the shaft 7. If the screw 27 is tightened, the external shoulder 15 is pressed against the backing face 17 so that a rigid connection is produced between the shaft 7 and hub 1. The connection is so tight that no additional mounting is necessary for the shaft 7 in the housing. By loosening the screw 24, the coupling parts can also be readily separated again.

Figure 6:
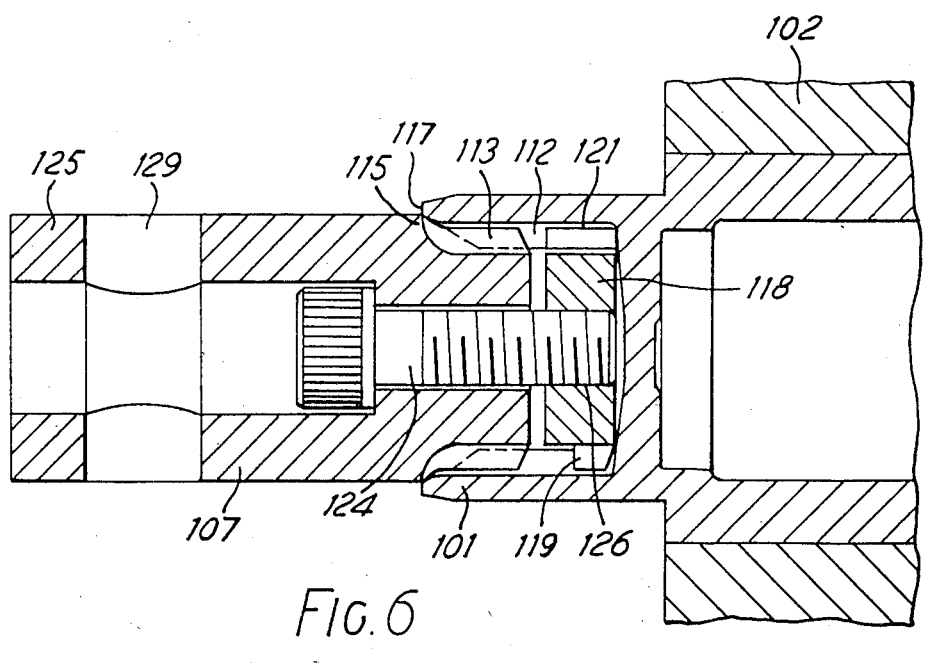
FIG. 6 is a longitudinal section through a second embodiment.

In the FIG. 6 embodiment, corresponding integers carry reference numerals increased by 100. This embodiment differs from that of FIGS. 1 to 5 in that the insert 118 is fixed against rotation to the hub 101 in that a pin 121 is placed between two adjacent radial projections 119 of the insert 118 and extends into a groove 112 of the hub 101. Further, the shaft 107 has a transverse bore 129 intersecting the axial bore 125 so that the steering wheel or some other component can be more readily secured thereto.

I claim:

1. A coupling for making a connection secured against relative rotational and axial displacement, comprising, a hub member having keys and grooves at the internal circumference thereof and a shaft memeber in coaxial relation thereto having keys and grooves at the external circumference thereof, said hub member having a circumferential groove undercutting said keys thereof, a shaft insert member having keys of a lessor axial length than said circumferential groove disposed in said circumferential groove, fastening means attaching said insert member to said hub member for rotation therewith which includes axially extending bores in said insert and shaft members equally radially offset from the axes of said members, said bores being circumferentially offset from each other by an angle equal to one half the circular pitch of said keys, said fastening means including pin means extending in and between said bores, said shaft member having a central bore and a central counterbore, said insert member having a central threaded bore, said keys of said insert and hub members having adjacent abuttingly engageable surfaces when said pin means is installed in said radially offset bores and said keys of said hub member engages said grooves of said shaft member in a driving relationship, and a screw in said shaft member central bore threadedly engaging said insert member central bore to hold said engageable surfaces in abutting engagement.

2. A coupling according to claim 1 characterized in that said shaft member grooves and said hub member keys are of relative lengths so that the outer ends of said hub member keys engage the inner ends of said shaft member grooves when said screw is in a fully tightened position.

3. A coupling according to claim 1 characterized in that said hub member has a cavity in which said insert member and one end of said shaft member are disposed, said insert member having the same key and groove configuration as said shaft member to facilitate the placing of said insert member in said circumferential groove.

4. A coupling according to claim 3 characterized in that said insert member keys are shaped and arranged to conform to said keys of shaft member.

5. A coupling according to claim 1 characterized in that said circumferential groove is disposed at the end of said hub member opposite to the end thereof in which said shaft member is inserted.

6. A coupling according to claim 1 characterized wherein said hub member has a cavity in which said insert member and one end of said shaft member are disposed, said pin means being longer than said hub cavity.

7. A coupling according to claim 1 characterized in that said pin means is a resilient clamping pin.

8. A coupling according to claim 3 characterized in that said hub cavity is closed at one side thereof.

* * * * *